United States Patent [19]
Nee

[11] Patent Number: 6,007,889
[45] Date of Patent: Dec. 28, 1999

[54] METAL ALLOYS FOR THE REFLECTIVE OR THE SEMI-REFLECTIVE LAYER OF AN OPTICAL STORAGE MEDIUM

[75] Inventor: Han H. Nee, Terre Haute, Ind.

[73] Assignee: Target Technology, LLC, Terre Haute, Ind.

[21] Appl. No.: 09/102,163

[22] Filed: Jun. 22, 1998

[51] Int. Cl.$^6$ .................................................. B32B 3/00
[52] U.S. Cl. .................... 428/64.1; 428/64.4; 428/457; 428/913; 430/270.11; 430/495.1; 430/945; 369/283; 369/288
[58] Field of Search ................................ 428/64.1, 64.2, 428/64.4, 457, 913; 430/270.11, 495.1, 945; 369/283, 288

[56] References Cited

U.S. PATENT DOCUMENTS

| | | |
|---|---|---|
| 4,405,994 | 9/1983 | Cornet et al. . |
| 4,450,553 | 5/1984 | Holster et al. . |
| 4,709,363 | 11/1987 | Dirks et al. . |
| 4,998,239 | 3/1991 | Strandjord et al. . |
| 5,090,009 | 2/1992 | Hamada et al. . |
| 5,093,174 | 3/1992 | Suzuki et al. . |
| 5,171,392 | 12/1992 | Iida et al. . |
| 5,325,351 | 6/1994 | Uchiyama et al. . |
| 5,391,462 | 2/1995 | Arioka et al. . |
| 5,415,914 | 5/1995 | Arioka et al. . |
| 5,419,939 | 5/1995 | Arioka et al. . |
| 5,620,767 | 4/1997 | Harigaya et al. . |
| 5,640,382 | 6/1997 | Florczak et al. . |

FOREIGN PATENT DOCUMENTS

| | | |
|---|---|---|
| 03286432A | 12/1991 | Japan . |
| 05012710 | 1/1993 | Japan . |
| 05215634 | 9/1994 | Japan . |
| 05115763 | 11/1994 | Japan . |
| 06107566 | 1/1995 | Japan . |
| 07014221A | 1/1995 | Japan . |
| 05195011 | 2/1995 | Japan . |
| 05179739 | 3/1995 | Japan . |
| 05215547 | 3/1995 | Japan . |
| 05233110 | 3/1995 | Japan . |
| 05249821 | 4/1995 | Japan . |
| 05251824 | 4/1995 | Japan . |
| 05277809 | 4/1995 | Japan . |
| 07105575A | 4/1995 | Japan . |
| 05132129 | 6/1995 | Japan . |
| 06065594 | 10/1995 | Japan . |
| 07036958 | 10/1995 | Japan . |
| 06111259 | 12/1995 | Japan . |
| 06123718 | 12/1995 | Japan . |
| 07116045 | 12/1995 | Japan . |
| 06141602 | 1/1996 | Japan . |
| 06143042 | 1/1996 | Japan . |
| 06206963 | 3/1996 | Japan . |
| 06225691 | 3/1996 | Japan . |
| 06253971 | 5/1996 | Japan . |
| 07223758 | 5/1996 | Japan . |
| 07038628 | 9/1996 | Japan . |
| 07076177 | 10/1996 | Japan . |
| 08297858 | 11/1996 | Japan . |
| 0713459 | 12/1996 | Japan . |
| 09007226 | 1/1997 | Japan . |
| 08014667 | 8/1997 | Japan . |
| 08019648 | 8/1997 | Japan . |
| 08035523 | 8/1997 | Japan . |
| 08050199 | 9/1997 | Japan . |
| 08115029 | 11/1997 | Japan . |
| 08149725 | 12/1997 | Japan . |
| 08158147 | 1/1998 | Japan . |

Primary Examiner—Elizabeth Evans
Attorney, Agent, or Firm—Woodard, Emhardt, Naughton, Moriarty & McNett Patent and Trademark Attorneys

[57] ABSTRACT

A copper-based or silver-based alloy thin film is provided for the highly reflective or semi-reflective layer of optical discs. Alloy additions to silver include gold, palladium, copper, rhodium, ruthenium, osmium, iridium, and platinum. Alloy additions to copper include silver, cadmium, gold, magnesium, aluminum, and nickel. These alloys have moderate to high reflectivity and reasonable corrosion resistance in the ambient environment.

30 Claims, 3 Drawing Sheets

METAL ALLOYS FOR THE REFLECTIVE OR THE SEMI-REFLECTIVE LAYER OF AN OPTICAL STORAGE MEDIUM

This invention relates to reflective layers or semi-reflective layers used in optical storage media that are made of silver-based alloys or copper-based alloys.

I. BACKGROUND OF THE INVENTION

Four layers are generally present in the construction of a conventional, prerecorded, optical disc. A first layer is usually made from optical grade, polycarbonate resin. This layer is manufactured by well-known techniques that usually begin by injection or compression molding the resin into a disc. The surface of the disc is molded or stamped with extremely small and precisely located pits and lands. These pits and lands have a predetermined size and, as explained below, are ultimately the vehicles for storing information on the disc.

After stamping, an optically reflective layer is placed over the information pits and lands. The reflective layer is usually made of aluminum or an aluminum alloy and is typically between about 40 to about 100 nanometers (nm) thick. The reflective layer is usually deposited by one of many well-known vapor deposition techniques such as sputtering or thermal evaporation. *Kirk-Othmer, Encyclopedia of Chemical Technology*, 3rd ed. Vol. 10, pp. 247 to 283, offers a detailed explanation of these and other deposition techniques such as glow discharge, ion plating, and chemical vapor deposition, and this specification hereby incorporates that disclosure by reference.

Next, a solvent-based or a UV (ultraviolet) curing-type resin is applied over the reflective layer, which is usually followed by a label. The third layer protects the reflective layer from handling and the ambient environment. And the label identifies the particular information that is stored on the disc, and sometimes, may include artwork.

The information pits residing between the polycarbonate resin and the reflective layer usually take the form a continuous spiral. The spiral typically begins at an inside radius and ends at an outside radius. The distance between any 2 spirals is called the "track pitch" and is usually about 1.6 microns. The length of one pit or land in the direction of the track is from about 0.9 to about 3.3 microns. All of these details are commonly known for compact audio discs and reside in a series of specifications that were first proposed by Philips NV of Holland and Sony of Japan as standards for the industry.

The disc is read by pointing a laser beam through the optical grade polycarbonate and onto the reflective layer with sufficiently small resolution to focus on the information pits. The pits have a depth of about ¼ of the wavelength of the laser light, and the light generally has a wavelength in the range of about 780 to 820 nanometers. Destructive (dark) or constructive (bright) interference of the laser light is then produced as the laser travels along the spiral track, focusing on an alternating stream of pits and lands in its path.

This on and off change of light intensity from dark to bright or from bright to dark forms the basis of a digital data stream of 1 and 0's. When there is no light intensity change in a fixed time interval, the digital signal is "0," and when there is light intensity change from either dark to bright or bright to dark, the digital signal is "1." The continuous stream of ones and zeros that results is then electronically decoded and presented in a format that is meaningful to the user such as music or computer programming data.

As a result, it is important to have a highly reflective coating on the disc to reflect the laser light from the disc and onto a detector in order to read the presence of an intensity change. In general, the reflective layer is usually aluminum, copper, silver, or gold, all of which have a high optical reflectivity of more than 80 percent. Aluminum and aluminum alloys are commonly used because they have a comparatively lower cost, adequate corrosion resistance, and are easily placed onto the polycarbonate disc.

Occasionally and usually for cosmetic reason, a gold or copper based alloy is used to offer the consumer a "gold" colored disc. Although gold naturally offers a rich color and satisfies all the functional requirements of a highly reflective layer, it is comparatively much more expensive than aluminum. Therefore, frequently a copper-based alloy that contains zinc or tin is sometimes used to produce the gold colored layer. But unfortunately, the exchange is not truly satisfactory because the copper alloy's corrosion resistance, in general, is considered worse than aluminum, which results in a disc that has a shorter life span than one with an aluminum reflective layer.

For the convenience of the reader, additional details in the manufacture and operation of an optically readable storage system can be found in U.S. Pat. Nos. 4,998,239 to Strandjord et al. and 4,709,363 to Dirks et al., the disclosures of which are hereby incorporated by reference.

Another type of disc in the compact disc family that has become popular is the recordable compact disc or "CD-R." This disc is similar to the CD described earlier, but it has a few changes. The recordable compact disc begins with a continuous spiral groove instead of a continuous spiral of pits and has a layer of organic dye between the polycarbonate substrate and the reflective layer. The disc is recorded by periodically focusing a laser beam into the grooves as the laser travels along the spiral track. The laser heats the dye to a high temperature, which in turn places pits in the groove that coincide with an input data stream of ones and zeros by periodically deforming and decomposing the dye.

For the convenience of the reader, additional details regarding the operation and construction of these recordable discs can be found in U.S. Pat. Nos. 5,325,351 to Uchiyama et al., and 5,391,462; 5,415,914; and 5,419,939 to Arioka et al., and 5,620,767 to Harigaya et al., the disclosures of which are hereby incorporated into this specification by reference.

The key component of a CD-R disc is the organic dye, which is made from solvent and one or more organic compounds from the cyanine, phthalocyanine or azo family. The disc is normally produced by spin coating the dye onto the disc and sputtering the reflective layer over the dye after the dye is sufficiently dry. But because the dye may contain halogen ions or other chemicals that can corrode the reflective layer, many commonly used reflective layer materials such as aluminum may not be suitable to give the CD-R disc a reasonable life span. So being, frequently gold must be used to manufacture a recordable CD. But while gold satisfies all the functional requirements of CD-R discs, it is a very expensive solution.

Still another type of disc in the optimal disc family that has become popular is a prerecorded optical disc called the digital video disc or "DVD." This disc has two halves. Each half is made of polycarbonate resin that has been injection or compression molded with pit information and then sputter coated with a reflective layer, as described earlier. These two halves are then bonded or glued together with a UV curing resin or a hot melt adhesive to form the whole disc. The disc can then be played from both sides as contrasted from the compact disc or CD where information is usually obtained only from one side. The size of a DVD is about the same as a CD, but the information density is considerably higher. The track pitch is about 0.7 micron and the length of the pits and lands is from approximately 0.3 to 1.4 microns.

One variation of the DVD family of discs is the DVD-dual layer disc. This disc also has two information layers; however, both are played back from one side. In this arrangement, the highly reflectivity layer is usually the same as that previously described. But the second layer is only semi-reflective with a reflectivity in the range of approximately 18 to 30 percent. In addition to reflecting light, this second layer must also pass a substantial amount of light so that the laser beam can reach the highly reflective layer underneath and then reflect back through the semi-reflective layer to the signal detector.

Currently, the potential choice of the semi-reflective layer is either gold or silicon in the thickness range of 5 to 70 nanometers, as discussed in U.S. Pat. No. 5,171,392 to Iida et al., the disclosure of which is hereby incorporated by reference. Gold, when sufficiently thin, will both reflect and transmit light, has outstanding corrosion resistance, and is relatively easy to sputter into a coating of uniform thickness. But once again, it is also comparatively more expensive than other metals. Silicon is a reasonable alternative to gold, but because it is a semiconductor, its sputtering yield and sputtering rate are significantly lower than gold when applied with the same power. Moreover, silicon also has a tendency to react with oxygen and nitrogen during sputtering, which introduces a whole additional set of problems. For example, usually the application of silicon requires a more complicated sputtering apparatus than one that is normally required to apply other reflective metals. And as a result, neither gold nor silicon offers an ideal semi-reflective layer for use in this type of disc.

For the convenience of the reader, additional details regarding the manufacture and construction of DVD discs can be found in U.S. Pat. No. 5,640,382 to Florczak et al. the disclosure of which is hereby incorporated by reference.

Therefore, what is needed are some new alloys that have the advantages of gold when used as a reflective layer or as a semi-reflective layer in an optical storage medium, but are not as expensive as gold. This invention addresses that need.

II. SUMMARY OF THE INVENTION

In one aspect, this invention is an optical storage medium with a first substrate having a pattern of features in at least one major surface and a first reflective layer adjacent the feature pattern. The reflective layer is made of a silver and gold alloy where the relationship between the amount of silver and the amount of gold is defined by $Ag_xAu_y$ where $0.9<x<0.999$ and $0.001<y<0.10$.

In another aspect, this invention is an optical storage medium with a first substrate having a pattern of features in at least one major surface and a first reflective layer adjacent the feature pattern. The reflective layer is made of a silver and palladium alloy where the relationship between the amount of silver and the amount of palladium is defined by $Ag_xPd_t$ where $0.85<x<0.999$ and $0.001<t<0.15$.

In another aspect, this invention is an optical storage medium with a first substrate having a pattern of features in at least one major surface and a first reflective layer adjacent the feature pattern. The reflective layer is made of a silver, gold, and palladium alloy where the relationship between the amount of silver, the amount of gold, and the amount of palladium is defined by $Ag_xAu_yPd_t$ where $0.75<x<0.998$, $0.001<y<0.10$, and $0.001<t<0.15$.

In another aspect, this invention is an optical storage medium with a first substrate having a pattern of features in at least one major surface and a first reflective layer adjacent the feature pattern. The reflective layer is made of a copper and silver alloy where the relationship between the amount of copper and the amount of silver is defined by $Cu_mAg_n$ where $0.95<m<0.9999$ and $0.0001<n<0.05$.

In another aspect, this invention is an optical storage medium with a first substrate having a pattern of features in at least one major surface and a first reflective layer adjacent the feature pattern. The reflective layer is made of a copper and cadmium alloy where the relationship between the amount of copper and the amount of cadmium is defined by $Cu_mCd_o$ where $0.85<m<0.9999$ and $0.0001<o<0.15$.

In another aspect, this invention is an optical storage medium with a first substrate having a pattern of features in at least one major surface and a first reflective layer adjacent the feature pattern. The reflective layer is made of a copper and gold alloy where the relationship between the amount of copper and the amount of gold is defined by $Cu_mAu_p$ where $0.7<m<0.9999$ and $0.0001<p<0.30$.

In another aspect, this invention is an optical storage medium with a first substrate having a pattern of features in at least one major surface and a first reflective layer adjacent the feature pattern. The reflective layer is made of a copper and magnesium alloy where the relationship between the amount of copper and the amount of magnesium is defined by $Cu_mMg_q$ where $0.9<m<0.9999$ and $0.0001<q<0.10$.

In another aspect, this invention is an optical storage medium with a first substrate having a pattern of features in at least one major surface and a first reflective layer adjacent the feature pattern. The reflective layer is made of a copper and aluminum alloy where the relationship between the amount of copper and the amount of aluminum is defined by $Cu_MAl_r$ where $0.8<m<0.9999$ and $0.0001<r<0.20$.

In another aspect, this invention is an optical storage medium with a first substrate having a pattern of features in at least one major surface and a first reflective layer adjacent the feature pattern. The reflective layer is made of a copper and nickel alloy where the relationship between the amount of copper and the amount of nickel is defined by $Cu_mNi_s$ where $0.87<m<0.9999$ and $0.0001<s<0.13$.

It is an objective of this invention to provide a new metallic alloy for thin film reflective layers that have high reflectivity and similar sputtering characteristics as gold, and is corrosion resistant and yet inexpensive. When a layer of this invention is made thin enough, it can be semi-reflective and transmissive to laser light for the application of DVD-dual layer.

It is another objective of this invention to create a new class of copper containing alloys for thin film reflective layers with moderate to high reflectivity and good corrosion resistance.

It is another objective of this invention to provide a lower cost alternative to the gold reflective layer in a recordable compact disc and still satisfy other functional requirements of the disc such as high reflectivity and corrosion resistance.

It is a further objective of this invention to provide a silver-based or a copper-based alloy for the semi-reflective version of the prerecorded mini-disc (MD) and other current or future generations of optical discs in which reflectivity, corrosion resistance, and ease of application are all important requirements for a low cost and high performance product.

III. BRIEF DESCRIPTION OF THE DRAWINGS

IV. DESCRIPTION OF PREFERRED EMBODIMENTS

Specific language is used in the following description and examples to publicly disclose the invention and to convey its principles to others. No limits on the breadth of the patent rights based simply on using specific language are intended. Also included are any alterations and modifications to the descriptions that should normally occur to one of average skill in this technology.

As used in this specification the term "atomic percent" or "a/o percent" refers to the amount of a particular metal or the amount of a group of particular metals that is present in a particular alloy based upon the number of that metal's atoms that are present, or the number of that group's atoms that are present, whichever the case may be. For example, an alloy that is 15 atomic percent metal "A" and 85 atomic percent metal "B" could also be referenced by a formula for that particular alloy: $A_{0.15}B_{0.85}$.

Figure 1:
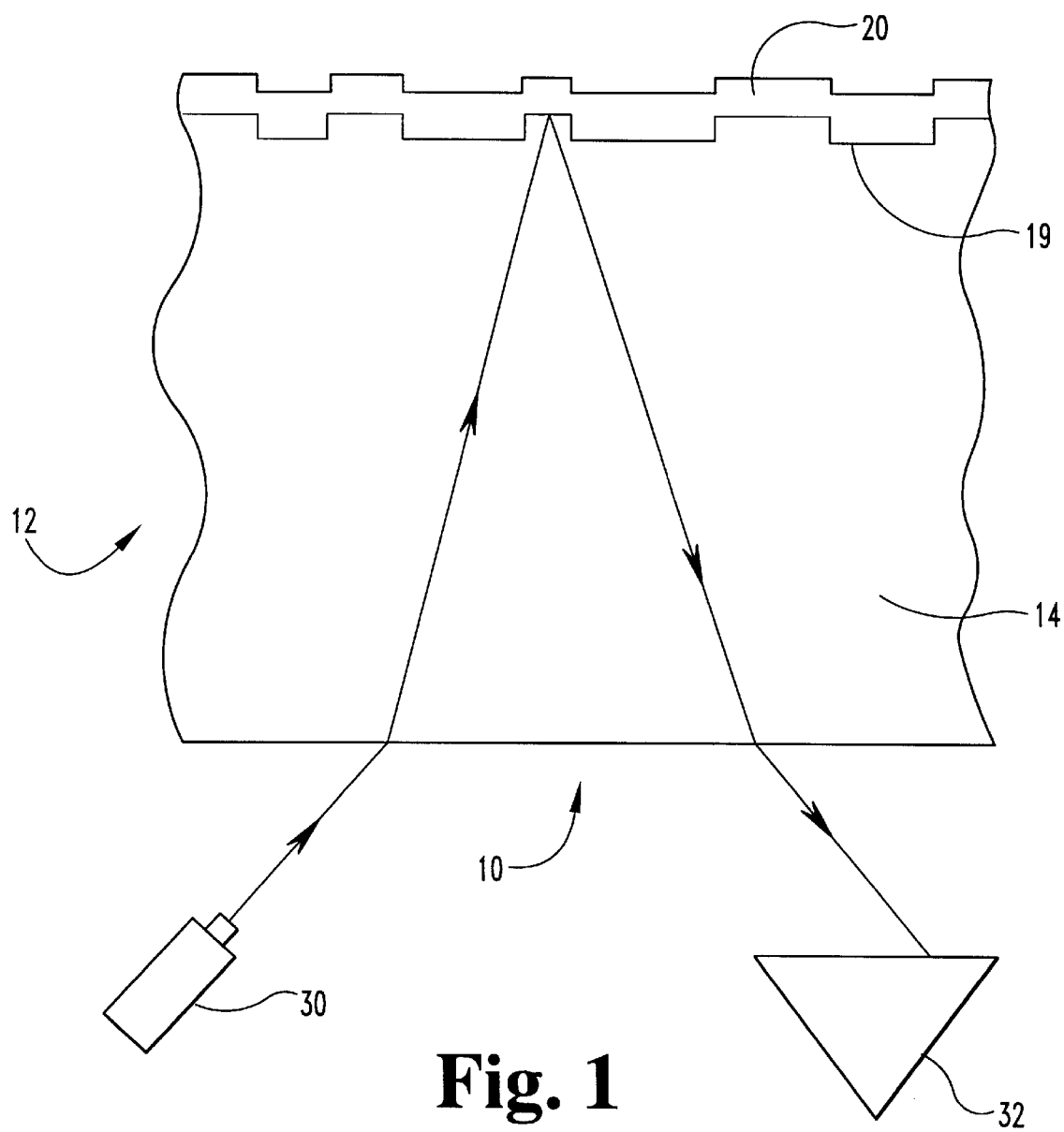
FIG. 1 is an optical storage system according to one embodiment of this invention.

This invention comprises multi-layer metal/substrate compositions that are used as optical data storage media. One embodiment of this invention is shown in FIG. 1 as optical data storage system 10. Optical storage medium 12 comprises a transparent substrate 14, and a highly reflective thin film layer 20 on a first data pit pattern 19. An optical laser 30 emits an optical beam toward medium 12, as shown in FIG. 1. Light from the optical beam that is reflected by thin film layer 20 is sensed by detector 32, which senses modulations in light intensity based on the presence or absence of a pit or land in a particular spot on the thin film layers. The disc is unique in that one of the alloys presented below is deposited upon the information pits and lands and is used as the highly reflective thin film 20. In one alternative (not shown), the disc may be varied by attaching two optical storage media 12 back-to-back, that is, with each transparent substrate 14 facing outward.

Figure 2:
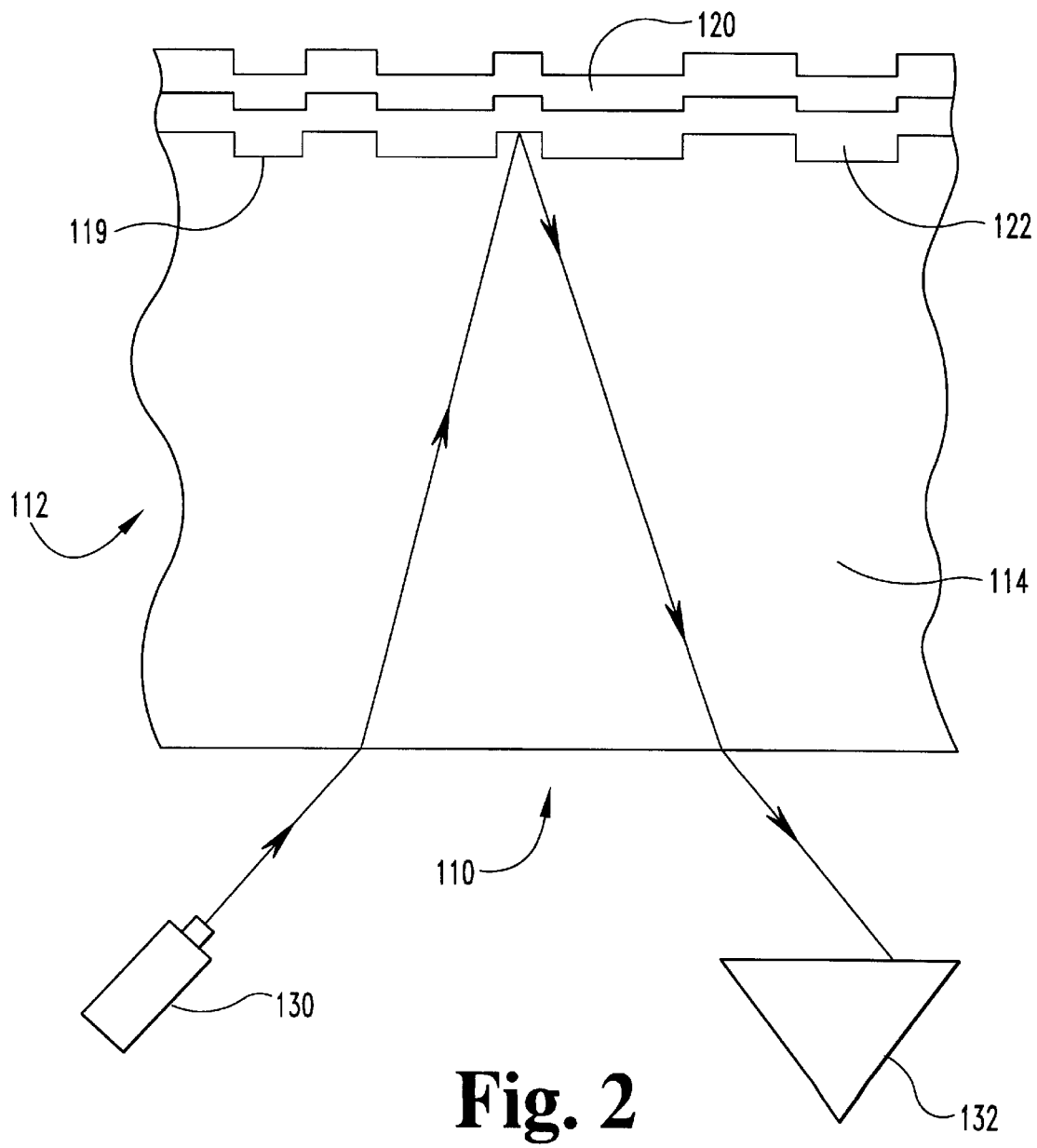
FIG. 2 is an optical storage system according to another embodiment of this invention where an organic dye is used as a recording layer.

Another embodiment of this invention is shown in FIG. 2 as optical data storage system 110. Optical storage medium 112 comprises a transparent substrate 114, and a highly reflective thin film layer 120, over a layer of dye 122, placed over a first pattern 119. An optical laser 130 emits an optical beam toward medium 112, as shown in FIG. 2. As discussed earlier, data is placed upon the disc by deforming portions of the dye layer with a laser. Thereafter, the disc is played by light from the optical beam, which is reflected by thin film layer 120 and sensed by detector 132. Detector 132 senses modulations in light intensity based on the presence or absence of a deformation in the dye layer. The disc is unique in that one of the alloys presented below is deposited over the dye layer 122 and is used as the highly reflective thin film 120. In one alternative (not shown), the disc may be varied by attaching two optical storage media 112 back-to-back, that is, with each transparent substrate 114 facing outward.

Figure 3:
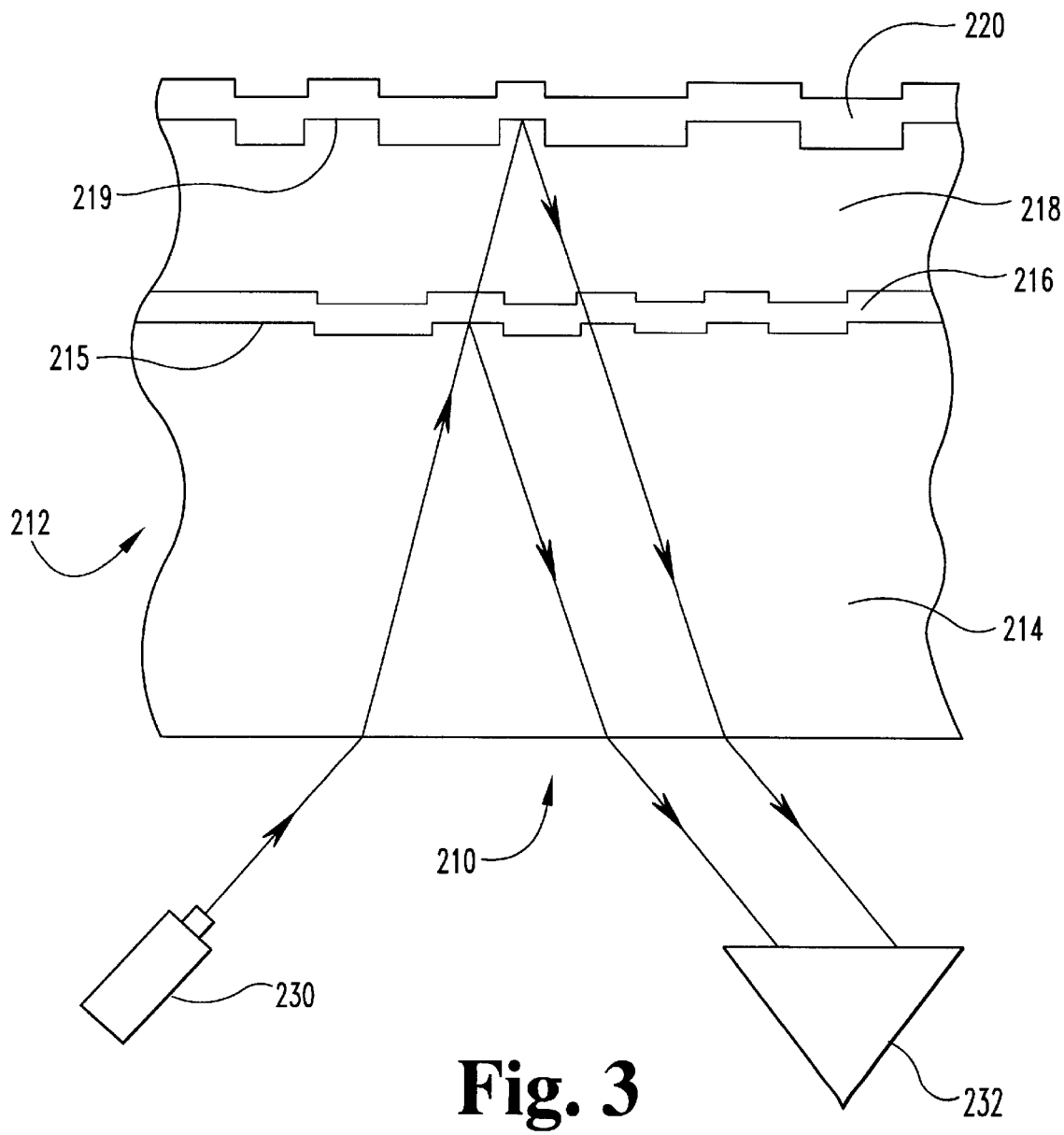
FIG. 3 is an optical storage system according to another embodiment of this invention with two layers of information pits where the playback of both layers is from one side.

Another embodiment of this invention is shown in FIG. 3 as optical data storage system 210. Optical storage medium 212 comprises a transparent substrate 214, a partially reflective thin film layer 216 on a first data pit pattern 215, a transparent spacer layer 218, and a highly reflective thin film layer 220 on a second data pit pattern 219. An optical laser 230 emits an optical beam toward medium 212, as shown in FIG. 3. Light from the optical beam that is reflected by either thin film layer 216 or 220 is sensed by detector 232, which senses modulations in light intensity based on the presence or absence of a pit in a particular spot on the thin film layers. The disc is unique in that one of the alloys presented below is deposited upon the information pits and lands and used as the highly reflective thin film 220 or semi-reflective layer 216.

As used herein, the term "reflectivity" refers to the fraction of optical power incident upon transparent substrate 14, 114, or 214 which, when focused to a spot on a flat region of layer 20, 120, 216, or 220 could in principle, be sensed by a photodetector in an optical readout device. It is assumed that the readout device includes a laser, an appropriately designed optical path, and a photodetector.

This invention is based on the inventor's discovery that a particular silver-based alloy provides sufficient reflectivity and corrosion resistance to be used as the reflective or the semi-reflective layer in an optical storage medium, without the inherent cost of a gold-based alloy. In one embodiment, the silver is alloyed with a comparatively small amount of gold. In this embodiment, the relationship between the amounts of gold and silver ranges from about 0.1 a/o percent (atomic percent) to about 10 a/o percent gold and from about 90 a/o percent to about 99.9 a/o percent silver. But preferably in respect to each metal, the alloy has from about 5 a/o percent to about 9.5 a/o percent gold and from about 91.5 a/o percent to about 95 a/o percent silver.

In another embodiment, the silver is alloyed with a comparatively small amount of palladium. In this embodiment, the relationship between the amounts of palladium and silver ranges from about 0.1 a/o percent (atomic percent) to about 15 a/o percent palladium and from about 85 a/o percent to about 99.9 a/o percent silver. But preferably in respect to each metal, the alloy has from about 4 a/o percent to about 11 a/o percent palladium and from about 89 a/o percent to about 96 a/o percent silver.

In still another embodiment, the silver is alloyed with a comparatively small amount of both gold and palladium. In this embodiment, the relationship between the amounts of gold, palladium and silver ranges from about 0.1 a/o percent to about 10 a/o percent gold, from about 0.1 a/o percent to about 15 a/o percent palladium, and from about 75 a/o percent to about 99.8 a/o percent silver. But preferably in respect to each metal, the alloy has from about 5 a/o percent to about 9.5 a/o percent gold, from about 5 a/o percent to about 10 a/o percent palladium, and from about 80.5 a/o percent to about 90 a/o percent silver.

The reflectivity of the above-described binary or ternary alloy systems can be adjusted by changing the concentration of each element. Because this ternary alloy system is isomorphous, there is no metallurgical difficulty in mixing the metals in any combination of concentrations to keep all the solutes in a single-phase solid solution. A single-phase alloy not only eliminates the chance of ejecting second phase particles during the sputtering process, but also minimizes any potential preferential corrosion sites in the thin film deposited on the optical disc.

The above-described binary or ternary alloy systems can be further modified by adding another element such as copper, which has an intrinsic reflectivity of more than 90 percent, or rhodium, which has an intrinsic reflectivity of about 80 percent. Copper is isomorphous with gold and palladium, but its solubility in silver is somewhat limited. Rhodium is isomorphous with palladium, but has very limited solubility in silver and gold. Therefore, if a single phase solid solution microstructure is desired in the sputtering target, the addition of copper or rhodium to the above silver-based binary or ternary alloy systems is limited to their respective solubility limits, which is about 5 a/o percent or less. However, this 5 a/o percent limit can be exceeded if a fast cooling rate is used both to make the sputtering target and to apply the target as a reflective film. Thus, in total, the preferred concentration of copper or rhodium as an additive to the above-described silver-based, binary or ternary alloy systems can exceed 5 a/o percent and is from about 0.01 a/o percent to about 10.0 a/o percent.

In another embodiment of the present invention, the silver-based, binary and ternary alloy systems are further alloyed with ruthenium, osmium, iridium, platinum, beryllium or mixtures of these precious metals. If one or a mixture of these precious metals replaces a portion of the silver in the alloy, the corrosion resistance of the resultant thin film will increase; however, the reflectivity will also drop. In relation to the amount of silver that is present in the above binary or ternary alloy systems, the amount of precious metal that may be preferably added ranges from about 0.01 a/o percent to about 5.0 a/o percent of the silver content.

In a second aspect, this invention is also based on the inventor's discovery that a copper-based alloy provides sufficient reflectivity and corrosion resistance to be used as the reflective layer or the semi-reflective layer in an optical storage medium, without the inherent cost of a gold-based alloy.

In one embodiment, the copper is alloyed with a comparatively small amount of silver. In this embodiment, the relationship between the amounts of silver and copper ranges from about 0.01 a/o percent (atomic percent) to about 5 a/o percent silver and from about 95 a/o percent to about 99.99 a/o percent copper.

In the fabrication process of the sputtering target, a fast cooling rate is necessary to quench the liquid melt into solids and prevent the silver from precipitating in the copper matrix. And in this regard, it is then preferred that the silver concentration in relation to the copper is kept from about 1.0 a/o percent to about 4.0 a/o percent. This includes all the commercial alloys of the oxygen-free silver-bearing copper with the Unified Number System designation C10400, C10500, C10600, and C10700 with minimum silver content of 0.027, 0.034, 0.054, and 0.085 weight percent, all the commercial silver-bearing tough pitch copper with UNS No. C11300, C11400, C11500, and C11600, and all the commercial alloys of the fire-refined tough pitch silver-bearing copper with UNS No. 12700, C12800, C12900 and C13000.

In a second embodiment, the copper is alloyed with a comparatively small amount of cadmium, which is an oxide former and an oxygen scavenger that will improve the oxidation resistance of copper while having a low impact on reflectivity. In this embodiment, the relationship between the amount of cadmium and copper ranges from about 0.01 a/o percent (atomic percent) to about 15 a/o percent cadmium and from about 85 a/o percent to about 99.99 a/o percent copper.

The solubility limits of cadmium in copper at 500° C. and 300° C. are respectively about 1.40 and 0.50 a/o percent. And at the eutectic temperature of copper and cadmium, the maximum solubility of cadmium in copper is approximately 2.14 a/o percent. Thus, for the same reasons as for the copper-silver alloys, it is again desirable to keep the cadmium in a solid solution of copper for use as a sputtering target. As a result, it is another embodiment of the this invention that the cadmium is added to copper preferably in the range of 0.1 a/o percent to 5.0 a/o percent. This range includes the commercial alloys of the so-called anneal-resistant electrolytic copper of UNS C11100 with about 0.01-wt. percent cadmium and about 0.04-wt. percent oxygen. And further includes the commercial alloys of cadmium and copper with UNS numbers C14300 and C14310 with cadmium concentrations in the range of 0.05 wt. percent to 0.15 wt. percent for C14300 and 0.10 to 0.31 wt. percent cadmium for C14310 respectively. And these still further include the commercial cadmium and copper alloys of C16200 with 0.70 wt. percent to 1.20 wt. percent cadmium.

In a third embodiment, the copper is alloyed with a comparatively small amount of gold. Gold is a noble metal, and will increase the corrosion resistance of copper. Gold is isomorphous with copper and can be added in any proportion to copper and still keep the copper-gold alloy a single phase; thus gold's addition to copper as an alloying element is theoretically unlimited and only limited in practice by the ultimate cost of the alloy. In this embodiment, the relationship between the amount of gold and copper ranges from about 0.01 a/o percent (atomic percent) to about 30 a/o percent gold, and from about 70 a/o percent to about 99.99 a/o percent copper. But preferably, in respect to each metal, this alloy has from about 0.1 a/o percent to about 5.0 a/o percent gold and from 95 a/o percent to about 99.9 a/o percent copper.

In a fourth embodiment, the copper is alloyed with a comparatively small amount of magnesium. In this embodiment, the relationship between the amount of magnesium and copper ranges from about 0.01 a/o percent (atomic percent) to about 10 a/o percent magnesium and from about 90 a/o percent to about 99.99 a/o percent copper. But preferably, in respect to each metal, this alloy has from about 0.10 a/o percent to about 5.0 a/o percent magnesium and from about 95 a/o percent to about 99.1 a/o percent copper. Similar to cadmium, magnesium is also a strong oxide former and oxygen scavenger, and is, therefore, capable of reacting with any residual oxygen in copper to form magnesium oxide.

In a fifth embodiment, the copper is alloyed with a comparatively small amount of aluminum. Aluminum will improve the corrosion resistance of copper and slow down the rate of oxide formation. In this embodiment, the relationship between the amount of aluminum and copper ranges from about 0.01 a/o percent (atomic percent) to about 20 a/o percent aluminum and from about 80 a/o percent to about 99.99 a/o percent copper. But preferably, in respect to each metal, this alloy has from about 0.1 a/o percent to about 10 a/o percent aluminum and from 90 a/o percent to 99.1 a/o percent copper. This range includes the commercial alloys C 60800 and C 61000, commonly known as 5 percent and 8 percent aluminum bronze with an aluminum concentration of about 5 percent and 8 percent by weight.

In a sixth embodiment, the copper is alloyed with a comparatively small amount of nickel, which will improve the corrosion resistance of copper. In this embodiment, the relationship between the amounts of nickel and copper ranges from about 0.01 a/o percent (atomic percent) to about 13 a/o percent nickel, and from about 87 a/o percent to about 99.99 a/o percent copper. This includes the commercial alloy C 70600, commonly known as 90-10 cupronickel.

In addition to all the above-described binary alloys, copper may also be alloyed with two or more of the foregoing metals. For example, nickel may also be included in combination with the above-described copper-aluminum alloy such as the commercial alloy C 61500 with nominal composition limits of aluminum from approximately 7.7 percent to approximately 8.3 percent by weight, and nickel from approximately 1.8 percent to approximately 2.2 percent by weight.

For the convenience of the reader, the following are some combinations of metals, where the metals are identified by their periodic table symbols, which may be preferably alloyed with copper: Ag+Cd, or Ag+Mg, or Cd+Mg; or Ag+Cd+Mg, or Ag+Cd+Ni, or Ag+Cd+Al, or Ag+Mg+Ni, or Ag+Mg+Al, or Ag+Ni+Al, or Cd+Mg+Ni, or Cd+Mg+Al, or Cd+Ni+Al, or Mg+Ni+Al; or Ag+Cd+Mg+Ni, Ag+Cd+Mg+Al, or Ag+Cd+Ni+Al, or Ag+Mg+Ni+Al; or Ag+Mg+Ni+Al.

In general, silver, cadmium, gold, magnesium, aluminum, beryllium and/or nickel may be alloyed with copper as a combination of two, three, four, or five metals of from about 0.01 a/o percent up to about 15 a/o (atomic percent) in relation to the amount of copper present. In other words, the total amount of these metals may range from 0.01 a/o percent to about 15 a/o and copper may range from about 85 a/o percent to about 99.99 a/o percent. But preferably, these metals range from about 0.1 a/o percent to about 6 a/o percent and copper ranges from about 94 a/o percent to about 99.9 a/o percent.

An example of a copper alloy system which includes most of the above-mentioned element additions with substantially improved corrosion resistance over pure copper and with high reflectivity and reasonably low cost is of the following composition in atomic percent: silver 0.2 percent, cadmium 0.3 percent, magnesium 1.0 percent, aluminum 1.2 percent, and nickel 0.8 percent with all other impurities less than 0.1 percent, and the balance copper. This alloy will have a reflectivity from approximately 72 percent to 82 percent depending on the manufacturing method of the alloy, and its application conditions onto the optical disc or other thin-film devices.

Having presented the preceding compositions for the starting materials, it is important to recognize that both the manufacturing process of the sputtering target and the process to deposit the target into a thin film play important roles in determining the final properties of the film.

To this end, a preferred method of making the sputtering target will now be described. In general, vacuum melting and casting of the alloys or melting and casting under protective atmosphere, are preferred to minimize the introduction of other unwanted impurities.

Afterwards, the as-cast ingot should undergo a cold working process to break down the segregation and the nonuniform as-cast microstructure. One preferred method is cold forging or cold uniaxial compression with more than 50 percent of size reduction, followed by annealing to recrystallize the deformed material into fine equi-axed grain structure with preferred texture of <1,1,0> orientation. This texture promotes directional sputtering in a sputtering apparatus so that more of the atoms from the sputtering target will be deposited onto the disc substrates for more efficient use of the target material.

Alternatively, a cold multi-directional rolling process of more than 50 percent size reduction can be employed, followed by annealing to promote a random oriented microstructure in the target and finally by machining to the final shape and size suitable for a given sputtering apparatus. This target with random crystal orientation will lead to a more random ejection of atoms from the target during sputtering and a more uniform thickness distribution in the disc substrate.

Depending on different discs' optical and other system requirements, either a cold forging or a cold multi-directional rolling process can be employed in the target manufacturing process to optimize the optical and other performance requirements of the thin film for a given application.

The alloys of this invention can be deposited in the well-known manners described earlier. Those being sputtering, thermal evaporation or physical vapor deposition, and possibly electrolytic or electroless plating processes. Depending on the method of application, the alloy thin film's reflectivity could vary. Any application method that adds impurities to or changes the surface morphology of the thin film layer on the disc could conceivably lower the reflectivity of the layer. But to the first order of approximation, the reflectivity of the thin film layer on the optical disc is primarily determined by the starting material of the sputtering target, evaporation source material, or the purity and composition of the electrolytic and electroless plating chemicals.

It should be understood that the reflective layer of this invention can be used for future generations of optical discs that use a reading laser of a shorter wavelength, for example, when the reading laser's wavelength is shorter than 650 nanometers.

It should also be understood that, if the reflective film is reduced to a thickness of approximately 5 to 20 nanometers, a semi-reflective film layer can be formed from the alloys of this invention that have sufficient light transmittance for use in DVD dual-layer applications.

V. EXAMPLES

EXAMPLE 1

An alloy composition of silver with approximately 8 to 10 atomic percent palladium will have a reflectivity of approximately 89 to 91 percent at the wavelength of 800 nanometers and a reflectivity of approximately 83 to 85 percent at the wavelength of 650 nanometers and a reflectivity of approximately 78 to 80 percent at the wavelength of 500 nanometers with the film thickness at about 50 to 100 nanometers.

EXAMPLE 2

A silver-rich alloy with 9.0 to 9.5 a/o percent of gold will have a reflectivity of approximately 94 to 95 percent at 650 nanometers wavelength. If a reflectivity higher than gold is desired, the gold concentration in silver can be reduced continuously to the pure silver side of the binary phase diagram without incurring any fabrication difficulty of the source material for sputtering or for thermal evaporation.

If the thickness of the thin film is reduced to the 10 to 20 nanometers range, the reflectivity will be reduced to 18 to 30 percent range applicable for DVD-9's semi-reflective layer. Adding a low concentration of an oxide former such as cadmium can further enhance the corrosion resistance of the alloy. As silver has a tendency to dissolve small amount of oxygen in the solid state which tends to lower the reflectivity of the alloy. The added cadmium will react with the oxygen to form cadmium oxide and lessen the degree of oxygen's impact to reflectivity. The desirable range of cadmium is in the approximate range of 0.01 percent to 5.0 atomic percent, with the preferred range from about 0.1 to 1.0 a/o percent.

EXAMPLE 3

A silver based alloy with about 5 a/o percent of gold and about 5 a/o percent of palladium will have a reflectivity of approximately 76 to 80 percent at the wavelength of about 650 nanometers.

VI. THE CLAIMS

While the invention has been illustrated and described in detail, this is to be considered as illustrative and not restrictive of the patent rights. The reader should understand that only the preferred embodiments have been presented and all changes and modifications that come within the spirit of the invention are included if the following claims or the legal equivalent of these claims describes them.

I claim:

1. An optical storage medium, comprising:
   a first substrate having a pattern of features in at least one major surface; and
   a first reflective layer adjacent the feature pattern, the reflective layer including a metal alloy, said metal alloy including silver and gold wherein the relationship between the amounts of silver and gold is defined by $Ag_xAu_y$ where $0.9<x<0.999$ and $0.001 \leq y \leq 0.10$.
2. The medium of claim 1, and wherein $0.05 \leq y \leq 0.095$.
3. The medium of claim 1, and further including:
   a second substrate having a pattern of features in at least one major surface;
   a second reflective layer adjacent the feature pattern of said second substrate; and
   a space layer, located between said first and second substrates.
4. The medium of claim 1, wherein said metal alloy includes a third metal that is copper, and wherein the relationship between the amounts of silver, gold, and copper is defined by $Ag_xAu_yCu_z$ where $0.0001<z<0.10$.
5. The medium of claim 2, wherein said metal alloy includes a third metal that is copper, and wherein the relationship between the amounts of silver, gold, and copper is defined by $Ag_xAu_yCu_z$ where $0.0001<z<0.05$.
6. The medium of claim 1, wherein said metal alloy includes a third metal that is rhodium, and wherein the relationship between the amounts of silver, gold, and rhodium is defined by $Ag_x Au_yRh_w$ where $0.0001<w<0.10$.
7. The medium of claim 2, wherein said metal alloy includes a third metal that is rhodium, and wherein the relationship between the amounts of silver, gold, and rhodium is defined by $Ag_xAu_yRh_w$ where $0.0001<w<0.05$.
8. The medium of claim 1, and wherein said metal alloy further comprises a precious metal selected from the group consisting of ruthenium, osmium, iridium, platinum, and mixtures thereof, and wherein said precious metal is present from about 0.01 a/o percent to about 5.0 a/o percent of the amount of silver present.
9. An optical storage medium, comprising:
   a first substrate having a pattern of features in at least one major surface; and
   a first reflective layer adjacent the feature pattern, the reflective layer including a metal alloy, said metal alloy including silver and palladium wherein the relationship between the amounts of silver and palladium is defined by $Ag_xPd_t$ where $0.85<x<0.999$ and $0.001<t<0.15$.
10. The medium of claim 9, and wherein $0.05 \leq t \leq 0.10$.
11. The medium of claim 9, and further including:
    a second substrate having a pattern of features in at least one major surface;
    a second reflective layer adjacent the feature pattern of said second substrate; and
    a space layer, located between said first and second substrates.
12. The medium of claim 9, wherein said metal alloy includes a third metal that is copper, and wherein the relationship between the amounts of silver, palladium, and copper is defined by $Ag_xPd_tCu_z$ where $0.0001<z<0.10$.
13. The medium of claim 10, wherein said metal alloy includes a third metal that is copper, and wherein the relationship between the amounts of silver, palladium, and copper is defined by $Ag_xPd_tCu_z$ where $0.0001<z<0.05$.
14. The medium of claim 9, wherein said metal alloy includes a third metal that is rhodium, and wherein the relationship between the amounts of silver, palladium, and rhodium is defined by $Ag_xPd_tRh_w$ where $0.0001<w<0.10$.
15. The medium of claim 10, wherein said metal alloy includes a third metal that is rhodium, and wherein the relationship between the amounts of silver, palladium, and rhodium is defined by $Ag_xPd_tRh_w$ where $0.0001<w<0.05$.
16. The medium of claim 9, and wherein said metal alloy further comprises a precious metal selected from the group consisting of ruthenium, osmium, iridium, platinum, and mixtures thereof, and wherein said precious metal is present from about 0.01 a/o percent to about 5.0 a/o percent of the amount of silver present.
17. An optical storage medium, comprising:
    a first substrate having a pattern of features in at least one major surface; and
    a first reflective layer adjacent the feature pattern, the reflective layer including a metal alloy, said metal alloy including silver, gold, and palladium wherein the relationship between the amounts of silver, gold, and palladium is defined by $Ag_xAu_yPd_t$ where $0.75<x<0.998$, $0.001<y<0.10$, and $0.001<t<0.15$.
18. The medium of claim 17, and wherein $0.05 \leq y \leq 0.095$ and $0.04 \leq t \leq 0.11$.
19. The medium of claim 17, and further including:
    a second substrate having a pattern of features in at least one major surface;
    a second reflective layer adjacent the feature pattern of said second substrate; and
    a space layer, located between said first and second substrates.
20. The medium of claim 17, wherein said metal alloy includes a third metal that is copper, and wherein the relationship between the amounts of silver, gold, palladium, and copper is defined by $Ag_xAu_yPd_tCu_z$ where $0.0001<z<0.10$.
21. The medium of claim 18, wherein said metal alloy includes a third metal that is copper, and wherein the relationship between the amounts of silver, gold, palladium, and copper is defined by $Ag_xAu_yPd_tCu_z$ where $0.0001<z<0.05$.
22. The medium of claim 17, wherein said metal alloy includes a third metal that is rhodium, wherein the relationship between the amounts of silver, gold, palladium, and rhodium is defined by $Ag_xAu_yPd_tRh_w$ where $0.0001<w<0.10$.
23. The medium of claim 18, wherein said metal alloy includes a third metal that is rhodium, wherein the relationship between the amounts of silver, gold, palladium, and rhodium is defined by $Ag_xAu_yPd_tRh_w$ where $0.0001<w<0.05$.
24. The medium of claim 17, and wherein said metal alloy further comprises a precious metal selected from the group consisting of ruthenium, osmium, iridium, platinum, and mixtures thereof, and wherein said precious metal is present from about 0.01 a/o percent to about 5.0 a/o percent of the amount of silver present.

25. An optical storage medium, comprising:

a first substrate having a pattern of features in at least one major surface; and a first reflective layer adjacent the feature pattern, the reflective layer including a metal alloy, said metal alloy including copper and silver wherein the relationship between the amounts of copper and silver is defined by $Cu_mAg_n$ where $0.95<m<0.9999$ and $0.0001<n<0.05$, and wherein said metal alloy includes the metals cadmium, magnesium, aluminum, and nickel, and where the amount of silver, cadmium, magnesium, aluminum, and nickel is no more than 6 atomic percent, and where the amount of copper is no less than 94 atomic percent.

26. The medium of claim 25, where silver is present at a level of 0.2 atomic percent, where cadmium is present at a level of 0.3 atomic percent, where magnesium is present at a level of 1.0 atomic percent, where aluminum is present at a level of 1.2 atomic percent, and where nickel is present at a level of 0.8 atomic percent.

27. An optical storage medium, comprising:

a first substrate having a pattern of features in at least one major surface; and a first reflective layer adjacent the feature pattern, the reflective layer including a metal alloy, said metal alloy including copper and cadmium wherein the relationship between the amounts of copper and cadmium is defined by $Cu_mCd_o$ where $0.85<m<0.9999$ and $0.0001<o<0.15$.

28. An optical storage medium, comprising:

a first substrate having a pattern of features in at least one major surface; and a first reflective layer adjacent the feature pattern, the reflective layer including a metal alloy, said metal alloy including copper and gold wherein the relationship between the amounts of copper and gold is defined by $Cu_mAu_p$ where $0.7<m<0.9999$ and $0.0001<p<0.30$.

29. An optical storage medium, comprising:

a first substrate having a pattern of features in at least one major surface; and a first reflective layer adjacent the feature pattern, the reflective layer including a metal alloy, said metal alloy including copper and magnesium wherein the relationship between the amounts of copper and magnesium is defined by $Cu_mMg_q$ where $0.9<m<0.9999$ and $0.0001<q<0.10$.

30. An optical storage medium, comprising:

a first substrate having a pattern of features in at least one major surface; and a first reflective layer adjacent the feature pattern, the reflective layer including a metal alloy, said metal alloy including copper and nickel wherein the relationship between the amounts of copper and nickel is defined by $Cu_mNi_s$ where $0.87<m<0.9999$ and $0.0001<s<0.13$.

* * * * *

UNITED STATES PATENT AND TRADEMARK OFFICE
CERTIFICATE OF CORRECTION

PATENT NO : 6,007,889
DATED : December 28, 1999
INVENTOR(S) : Han H. Nee

It is certified that error appears in the above-identified patent and that said Letters Patent is hereby corrected as shown below:

In Column 4, line 34, please delete "$Cu_M$" and insert in lieu thereof -- $Cu_M$ --.
In Column 11, line 20, please delete "$\leq y \geq$" and insert in lieu thereof -- $\leq y \geq$ --.
In Column 11, line 21, please delete "$\leq y \geq$" and insert in lieu thereof -- $\leq y \geq$ --.
In Column 11, line 60, please delete "$\leq y \geq$" and insert in lieu thereof -- $\leq y \geq$ --.
In Column 12, line 32, please delete "$\leq y \geq$" and insert in lieu thereof -- $\leq y \geq$ --.
In Column 12, line 33, please delete "$\leq y \geq$" and insert in lieu thereof -- $\leq y \geq$ --.

Signed and Sealed this

Nineteenth Day of September, 2000

Q. TODD DICKINSON

*Attest:*

*Attesting Officer*　　　　　　　　*Director of Patents and Trademarks*

UNITED STATES PATENT AND TRADEMARK OFFICE
CERTIFICATE OF CORRECTION

PATENT NO.       : 6,007,889
APPLICATION NO.  : 09/102163
DATED            : December 28, 1999
INVENTOR(S)      : Han H. Nee Page 1 of 1

It is certified that error appears in the above-identified patent and that said Letters Patent is hereby corrected as shown below:

Column 4, line 34, please delete "$Cu_M$" and insert in lieu thereof --$Cu_m$--.

In Column 11, line 20, claim 1, please delete "$\leq y \leq$" and insert in lieu thereof --$<y<$--.

In Column 11, line 21, claim 2, please delete "$\leq y \leq$" and insert in lieu thereof --$\leq y \leq$--.

In Column 11, line 60, claim 10, please delete "$\leq t \leq$" and insert in lieu thereof --$\leq t \leq$--.

In Column 12, line 32, claim 18, please delete "$\leq y \leq$" and insert in lieu thereof --$\leq y \leq$--.

In Column 12, line 33, claim 18, please delete "$\leq t \leq$" and insert in lieu thereof --$\leq t \leq$--.

Signed and Sealed this

Fifteenth Day of January, 2008

JON W. DUDAS
*Director of the United States Patent and Trademark Office*